(12) United States Patent
Edwards

(10) Patent No.: US 6,604,776 B2
(45) Date of Patent: Aug. 12, 2003

(54) VEHICLE THEFT PREVENTION SYSTEM

(76) Inventor: Richard A. Edwards, 7245 Radbourne Rd., #D, Upper Darby, PA (US) 19082

(*) Notice: Subject to any disclaimer, the term of this patent is extended or adjusted under 35 U.S.C. 154(b) by 0 days.

(21) Appl. No.: 09/847,437

(22) Filed: May 3, 2001

(65) Prior Publication Data

US 2002/0017802 A1 Feb. 14, 2002

Related U.S. Application Data

(60) Provisional application No. 60/222,324, filed on Aug. 1, 2000.

(51) Int. Cl.$^7$ .................................................. B60J 1/20
(52) U.S. Cl. .................... 296/152; 296/95.1; 70/455
(58) Field of Search ................. 296/152, 95.1, 296/136, 97.8; 49/56, 63; 89/36.01, 36.02, 36.08; 70/158, 170, 455; 160/370.21

(56) References Cited

U.S. PATENT DOCUMENTS

| | | | | |
|---|---|---|---|---|
| 2,096,568 A | | 10/1937 | Snively | |
| 2,780,458 A | * | 2/1957 | Thaxton | |
| 3,246,495 A | * | 4/1966 | Crumb | |
| 3,421,350 A | | 1/1969 | Shanok et al. | |
| 3,434,318 A | | 3/1969 | Thiry | |
| 3,454,301 A | * | 7/1969 | Lehmann | |
| 3,770,313 A | * | 11/1973 | Jimenez | |
| 4,282,732 A | | 8/1981 | Bennett | |
| 4,331,359 A | * | 5/1982 | Sheldon | |
| 4,643,477 A | | 2/1987 | Kovatch | |
| 4,700,556 A | * | 10/1987 | Wade, Sr. et al. | 70/455 |
| 4,858,454 A | | 8/1989 | McAnulty, III | |
| 4,902,062 A | * | 2/1990 | Pusic et al. | 296/97.8 X |
| 4,909,044 A | * | 3/1990 | Gudmundsen | |
| 4,929,014 A | * | 5/1990 | Clark et al. | 296/97.8 |
| 4,930,255 A | * | 6/1990 | Sea | 49/63 |
| 5,165,188 A | * | 11/1992 | Tsiros | |
| 5,186,512 A | * | 2/1993 | VandenBerge et al. | 296/97.8 |
| 5,413,026 A | | 5/1995 | Madden, Jr. | |
| 5,550,529 A | * | 8/1996 | Burge | 70/455 X |
| 5,570,542 A | | 11/1996 | Cameron | |
| 5,746,469 A | * | 5/1998 | Nonaka | |
| 5,857,730 A | | 1/1999 | Korpi et al. | |
| 5,916,282 A | * | 6/1999 | Elm et al. | 70/455 X |
| 6,227,601 B1 | * | 5/2001 | LaFrance | 296/97.8 X |
| 6,276,742 B1 | * | 8/2001 | Bend et al. | 296/95.1 |
| 6,293,607 B1 | * | 9/2001 | Sasanuma | 296/37.8 X |

FOREIGN PATENT DOCUMENTS

| | | |
|---|---|---|
| DE | 4142416 | 6/1993 |
| EP | 653298 | 5/1995 |
| GB | 351049 | 6/1931 |
| GB | 383984 | 12/1932 |
| GB | 1318145 | 5/1973 |

* cited by examiner

*Primary Examiner*—Joseph D. Pape
(74) *Attorney, Agent, or Firm*—Richard C. Litman

(57) ABSTRACT

A vehicle theft prevention system effectively secures the contents and/or occupants of a parked vehicle. The system includes protective cover plates for the vehicle windows and locks, with either or both sets of cover plates being remotely actuated by a central control system. The side window covers are mounted within the vehicle doors and/or rear side panels and move parallel to the adjacent glass window panes, with front and rear covers being retractable into the vehicle roof. A lift assembly extends and retract the coverings. The same motor may operate to move both the window coverings and adjacent glass window panes, or separate mechanisms may be provided. The keyhole shield or lock cover prevents an intruder from picking or breaking the locks of the vehicle. Electric motors extend and retract the lock cover plates between a lock concealing position and a lock access position.

7 Claims, 4 Drawing Sheets

VEHICLE THEFT PREVENTION SYSTEM

CROSS-REFERENCE TO RELATED APPLICATION

This application claims the benefit of U.S. Provisional Patent Application Serial No. 60/222,324, filed Aug. 1, 2000.

BACKGROUND OF THE INVENTION

1. Field of the Invention

The present invention relates generally to automotive accessories, and more particularly to anti-theft devices for vehicles. The present invention essentially comprises a series of metal plates which are movably placeable adjacent the window glass of an automotive vehicle, and a series of lock protective plates movably placeable over the locks and keyholes of the vehicle.

2. Description of Related Art

Vehicle theft and break-in has become an increasingly severe problem over the years. Modern automobiles tend to be considerably more sophisticated than their earlier counterparts, and as a result various parts and systems for modern automobiles are relatively costly to repair or replace. This has led to the development of a relatively large black market business involving the theft and dismantling of automobiles for the value of their components.

Of course, automobiles and other motor vehicles are stolen for other reasons as well, i. e., for resale as a complete vehicle. Unscrupulous persons alter and modify the serial numbers found in various areas and on various components of the vehicle, and replace these numbers with new serial numbers which are not readily traceable. If the automobile itself is not of interest to a potential thief, then its contents may be attractive, with the contents oftentimes being readily visible through the window glass of the car if they are stowed within the passenger compartment.

This has led to increasingly sophisticated anti-theft means for newer automobiles and other motor vehicles. Such anti-theft means range from more sophisticated lock and key mechanisms and steering column locks, to various electronic systems including remote lock controls actuated by radio or infrared frequency technology, and various types of alarms actuated by proximity sensors, movement and sound detectors, and other principles.

While these various anti-theft measures provide some additional degree of protection for the vehicle and its contents, it remains true that if a thief can get into the vehicle, either with or without damage to the vehicle, then it becomes most likely that the vehicle, or at least some of its interior components (sound system, etc.) and/or contents will be stolen. While audible alarms have provided some assistance in this regard, their use has become so widespread that most people pay little attention to the sound of an activated automobile alarm.

It is a simple matter for a practiced thief to break the window glass to access the interior door latch, open the door, and silence the alarm (if any) by pulling wiring and/or fuses, all within a few seconds. Once the thief has gained access to the vehicle interior and silenced the alarm (if any), from this point on it becomes relatively easy to remove the stereo and sound system of the vehicle (likely with little regard to the remainder of the vehicle interior), and/or destroy the steering column lock so the vehicle may be driven, or at least towed or transported, away.

Accordingly, a need will be seen for some means for preventing unauthorized persons from gaining access to the interior of the vehicle in the first place. If this prevention of unauthorized access can be achieved, the likelihood of theft of the vehicle drops considerably, and of course nothing can be taken from the interior of the vehicle. The present invention responds to this need by means of a series of movable plates disposed immediately adjacent and exteriorly to the conventional side window glass of the vehicle, with the plates being raised when the vehicle is parked and unattended. Additional plates may be provided to protect the front and rear glass of the vehicle as well. The present invention also provides for protection of the door locks of the vehicle, by means of a corresponding number of protective plates that extend to cover the faces of the lock cylinders and their keyholes. The lock protective means and window protective means may be actuated by a single common actuation means (key, remote control, etc.), as desired.

A discussion of the related art of which the present inventor is aware, and its differences and distinctions from the present invention, is provided below.

U.S. Pat. No. 2,096,568 issued on Oct. 19, 1937 to John W. Snively, titled "Cover For Motor Vehicle Locks," describes a hinged cover adapted to protect the lock cylinder from the elements. The Snively cover is hinged above the lock cylinder, and includes a spring urging the cover to a closed position. This is the only means for closing the cover over the lock; no positive retention means is provided to prevent lifting of the cover to access the lock. The Snively lock cover is not intended to protect the lock from attempts at unauthorized entry. In fact, the Snively cover teaches away from such protection, by providing a lifting tab for ease of access to the lock, and means for holding the cover in its raised position after it has been lifted.

U.S. Pat. No. 3,421,350 issued on Jan. 14, 1969 to Victor Shanok et al., titled "Protective Cover For A Keyhole Assembly," describes a cover serving the same purpose as the cover of the Snively '568 U.S. Patent discussed immediately above. The Shanok et al. cover secures magnetically about the exposed end of Ithe lock cylinder and key slot or keyhole, and is secured to the adjacent structure by a small chain or other retaining line. As in the case of the device of the Snively '568 Patent, the Shanok et al. device does nothing to prevent unauthorized entry, as it is easily removable without excessive force, tools, or damage to the lock or surrounding structure.

U.S. Pat. No. 3,434,318 issued on Mar. 25, 1969 to Gerald J. Thiry, titled "Door And Trunk Lock Cover," describes a removable cover for exterior locks and handles of an automobile. The Thiry cover is a thin, flexible material having a series of peripherally disposed magnets therein, for removably securing the device over a door lock or handle assembly or the like. The Thiry cover falls in the same category as the Snively and Shanok et al. lock protective devices described further above, in that it is only intended to protect the lock and latch mechanism from the elements, and does nothing to prevent unauthorized access to the lock or latch.

U.S. Pat. No. 4,282,732 issued on Aug. 11, 1981 to Robert A. Bennett, titled "Dust Cover For Lock," describes a hinged protective cover more closely related to the cover of the Snively '568 U.S. Patent, than to the present invention. The Bennett cover is hinged to a peripheral frame or bezel, which in turn secures adhesively around the face of the lock cylinder. The Bennett cover is intended for the same purpose as the other lock covers discussed above, i. e., to prevent entry of dust, moisture, etc. from the environment, and does nothing to preclude unauthorized access to the underlying lock cylinder.

U.S. Pat. No. 4,643,477 issued on Feb. 17, 1987 to Stephen C. Kovatch, titled "Demountable Windshield Armor For Vehicles," describes the installation of a sheet of transparent armor material within and adjacent to the vehicle windshield. The transparent material comprises some form of relatively thick polycarbonate plastic material (e. g., Lexguard®) which remains in place between the windshield and occupants at all times, due to its transparency. The Kovatch U.S. Patent describes a track and hinge means which allows the transparent armor sheet to be moved upwardly and rearwardly for accessing the space between the armor sheet and the interior of the windshield, for cleaning, etc. The present invention provides movable armor plate for installation immediately within the glass areas of the vehicle, but utilizes completely different, motorized means for retracting the armor panels for vehicle operation. As the present armor panels are not transparent, they must be moved each time the vehicle is operated. The present armor panels utilize either conventional window lift mechanisms (for side window panels) or tracks which raise and lower the panels exteriorly of the windshield and rear window glass, as appropriate. The present panels are stored within the vehicle doors, body work, and/or roof when retracted.

U.S. Pat. No. 4,858,454 issued on Aug. 22, 1989 to Frederick J. McAnulty, III, titled "Door Lock Protecting Device," describes a lock cover similar to those described in the U.S. Patents to Snively, Shanok et al., and Bennett described further above. The McAnulty, III lock cover also has a hinged attachment to a surrounding bezel or base which is mechanically secured (screws, rivets, etc.) about the face of the lock cylinder. The cover is held in place only by magnetic force which is easily overcome for access to the underlying lock cylinder and keyhole. No means for preventing access to the lock by unauthorized persons, is provided by the McAnulty, III lock cover.

U.S. Pat. No. 5,413,026 issued on May 9, 1995 to James R. Madden, Jr., titled "Removable Bulletproof Apparatus For Vehicles," describes opaque flexible armor sheets (e. g., Kevlar™, etc.) which extend below the window areas within vehicle doors or other body panels, and rigid transparent armor plates which attach within the windows of the vehicle. Both the transparent panels and the flexible curtains are removable from their common brackets and from the vehicle, but they do not retract into the doors and other bodywork of the vehicle, as provided by the present vehicle armor invention. The Madden, Jr. armor is intended to remain in place during vehicle operation, rather than being removed (or retracted, in the case of the present window protective armor) during vehicle operation. Moreover, the Madden, Jr. armor deploys within the vehicle, rather than exteriorly of the vehicle glass.

U.S. Pat. No. 5,570,542 issued on Nov. 5, 1996 to Allan Cameron, titled "Safety Shield Window Insert," describes a transparent insert adapted to fit within the conventional window opening of a vehicle. The lower edge of the insert secures to the upper edge of the nearly retracted window glass, with the upper edge fitting within the upper window channel of the opening. A series of perforations may be provided for ventilation. Cameron notes that while the primary point of his invention is to retain a child or pet within a vehicle, the device may be formed of an impact or ballistic resistant material, as well. Also, while Cameron notes that his insert may be made to retract, he does not disclose any retraction means for the device.

U.S. Pat. No. 5,857,730 issued on Jan. 12, 1999 to John G. Korpi et al., titled "Low Visibility Armor Structure With Add-On Window Armor Component," describes a door and window armor assembly more closely resembling the armor of the Madden '026 U.S. Patent, with the window armor retaining means resembling the window insert retaining means of the Cameron '542 U.S. Patent. The door panel armor component has hooks by which it hangs on the door. The window armor includes a transparent frame for attachment to the window frame and to the lower door armor. No retraction means is disclosed in the Korpi et al. U.S. Patent, nor is any ventilation or lock covering means provided by Korpi et al.

British Patent No. 351,049, published Jun. 22, 1931, titled "A New Or Improved Device For Preventing The Unauthorized Operation Of Locks, Latches, And The Like," describes a latch cover for use with "rim" type locks and latches, as used in doors for domestic structures and the like. The Dunagen Lock device essentially comprises a stamped sheet metal cover which is held in place over the latch assembly by means of the latch bolt passing through a passage in the end thereof, which is captured between the edge of the door and the door jamb. A metal cup is removably secured over the rotatable latch knob of the mechanism. This assembly precludes breakage of glass or other breaching of the door structure by an unauthorized person, to open the door by operating the latch knob. The device is not adaptable for protecting the internally set lock cylinder of a motor vehicle or the like, as provided by one aspect of the present invention.

British Patent No. 383,984, published Dec. 1, 1932, titled "Improvements Relating To Keyhole Covers Or Escutcheon Plates," describes a device for protecting locks and the like from weather, in keeping with the devices of the U.S. Patents to Snively, Shanok et al., Bennett, and McAnulty, III, discussed further above. The Harvey & Co. device comprises a base or escutcheon which bolts or fastens in place about the lock similarly to the base of the McAnulty, III device. The overlying cover or cap is pivotally attached thereto, at one edge thereof. The cap pivots on an axis parallel to the elongate axis of the lock cylinder, rather than being hinged at one side. However, the Harvey & Co. lock cover is not a security device and does nothing to prevent unauthorized persons from accessing the lock cylinder, as provided by the present invention.

British Patent No. 1,318,145, published May 23, 1973, titled "Armoured Vehicle," describes a kit for converting a conventional early Land Rover™ or Toyota Land Cruiser™ into an armored vehicle. The kit primarily comprises a series of metal plates which are attached to the vehicle to essentially cover the engine and passenger areas in armor. However, the armor at and above the window area of the vehicle is essentially permanently affixed in place, with only relatively narrow slits provided for outward vision. No means of retracting the armor from the window area for normal vehicle operation, is disclosed. In contrast, the present theft prevention system allows the window protection to be retracted for vehicle operation.

German Patent No. 4,142,416, published Jun. 24, 1993, describes (according to the English title and abstract and the drawings) a penetration resistant edge for a laminated "bulletproof" vehicle window. A steel angle is installed along the edge of the glass assembly, providing better resistance to penetration by a projectile. No disclosure is apparent of any retraction means for the system, as the transparent glass is intended to stay in place during vehicle operation, unlike the present retractable opaque armor panels.

Finally, European Patent No. 653,298, published May 17, 1995, describes (according to the English abstract and the drawings) a laminated "bulletproof" glass assembly having one sheet of glass therein with a high absorbency in the spectral band between 780 and 1200 nanometers (nm), or in other words, in the infrared region just beyond the lowest frequencies of the visible light spectrum. This allows persons within the vehicle to see clearly from the vehicle in normal lighting conditions or using visible light at night, but tends to block infrared emissions therethrough. This precludes persons outside the vehicle from observing persons within the vehicle by means of infrared equipment. However, there is no apparent disclosure in the '298 European Patent Publication providing for the retraction of opaque armor panels for vehicle operation, nor for protection of the vehicle door locks when the vehicle is unattended.

None of the above inventions and patents, either singly or in combination, is seen to describe the instant invention as claimed.

SUMMARY OF THE INVENTION

The present vehicle theft prevention system, provides an effective means for securing the contents and/or occupants of a vehicle, while preserving the vehicle's aesthetic appearance. The present system comprises removably covering each of the windows of a vehicle with a panel section or sheet of steel and also covering the individual keyholes or locks of the doors; the lock (and window) covers may be remotely activated by a central control system. The system may comprise a portable hand-held transmitter for generating a command, or a controller mounted in the interior of the vehicle. The system may also be used with other conventional vehicle security systems including an alarm system, automated door locks and/or trunk latch, etc.

The side window panels are preferably mounted within the doors and/or the rear side panels of the vehicle to move in parallel with the glass window panes installed therein, with each protective plate disposed exteriorly of the respective glass window panel. The system further comprises hand operated or powered window lift assemblies to extend and retract the protective panels. Preferably, the protective panels and glass operate independently, to allow the glass to remain lowered for ventilation through the ventilated protective panels and to allow the glass to remain raised while the protective panels are lowered during vehicle operation. Alternatively, the same motor may operate to extend and retract the protective panels and their adjacent windows, though the panes and panels have separate tracks upon which they are slidably mounted.

The steel panel sections for the front and rear vehicle glass, i. e., the windshield and backlight, are preferably maintained in their retracted positions in the front and rear portions of the roof of the vehicle, respectively. This provides an important advantage in terms of storage, aesthetic appearance, and maximum efficient utilization of space, while protecting the panel sections when not in use.

The keyhole shield or lock cover of the present invention provides an effective means of preventing an intruder from picking or breaking the lock of the vehicle. An electric motor drive unit moves the lock cover plate linearly between an unlocked position wherein the keyhole is unobstructed, to a locked position wherein the keyhole is obstructed by the cover. Once the steel panel sections and keyhole shield are engaged, the vehicle interior becomes practically inaccessible to outside parties.

In the preferred embodiment of the invention, a plurality of holes is provided through the steel panel sections of the side panels so that air can flow therethrough. Each steel panel section and lock cover may move individually under direct operator control, allowing, for example, the operator to enter the vehicle, even though the panels are still in raised position. And while the panel sections are preferably formed of steel, it should be understood that any suitably strong and durable substance may be used, including bullet proof and high-impact material.

Accordingly, it is a principal object of the invention to provide a comprehensive vehicle theft prevention system.

It is another object of the invention to provide a vehicle theft prevention system, which reliably excludes intruders from entering a vehicle through the windows or by picking the locks.

It is a further object of the invention to provide a vehicle theft prevention system which when actuated serves to conceal the vehicle interior and its contents, and when disengaged is largely unnoticeable.

An additional object of the invention is to provide a vehicle theft prevention system including a series of retractable armor panels which are selectively extendible to cover the side windows and/or front and rear glass areas of the vehicle as desired.

Yet another object of the invention is to provide a vehicle theft prevention system including ventilation means for the extended armor panels.

Still another object of the invention is to provide a vehicle theft prevention system including selectively extendible and retractable lock covering means.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
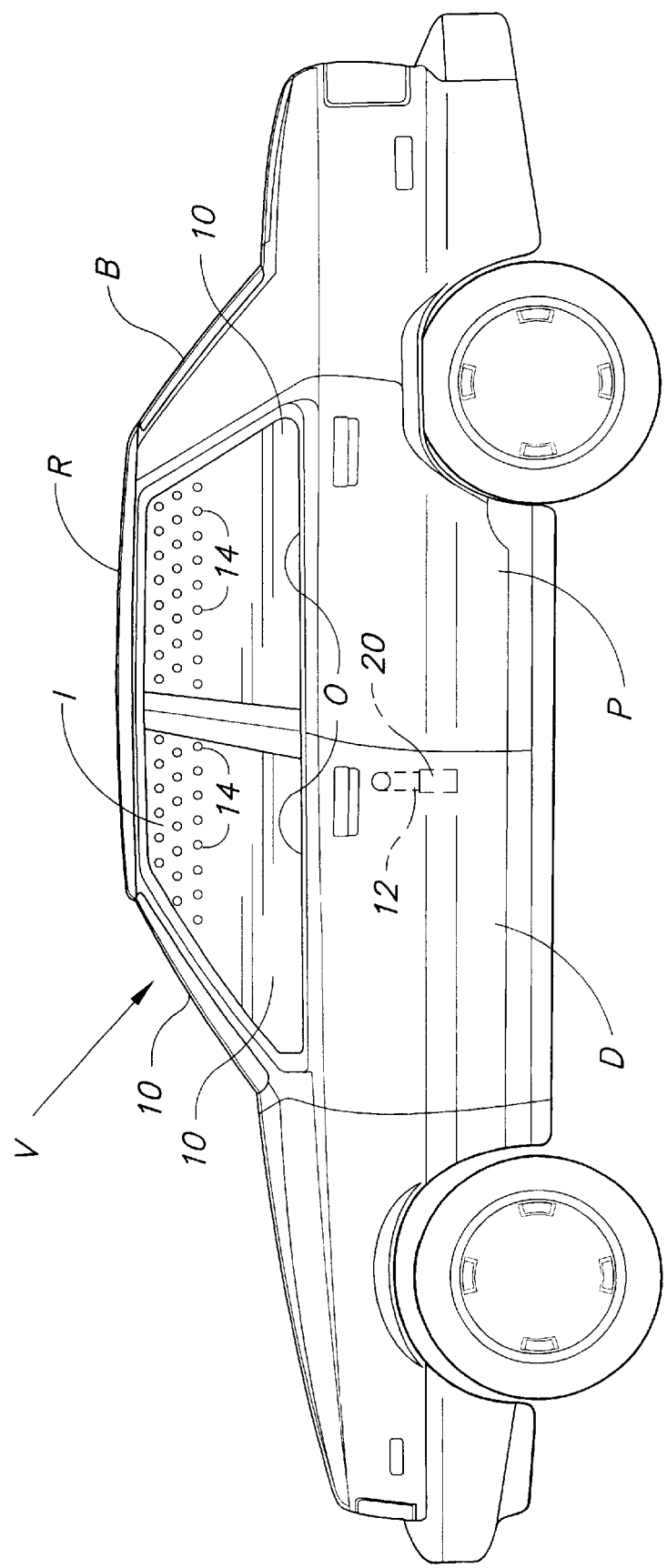
FIG. 1 is an environmental, perspective view of a motor vehicle equipped with the present vehicle theft prevention system.

The present invention comprises a vehicle theft prevention system for preventing unauthorized access to the window glass area and locks of a motor vehicle (automobile, light truck, etc.). FIG. 1 provides a side elevation view of a motor vehicle V having an interior I and doors D or side panels P with window openings O and glass windows W therein (shown in FIGS. 3 and 4). Although the vehicle V of FIG. 1 is a four door model, the present invention is also adaptable to two door vehicles, with the rear door indicated by the letter P in FIG. 1 being a fixed side panel in such cases.

Figure 2:
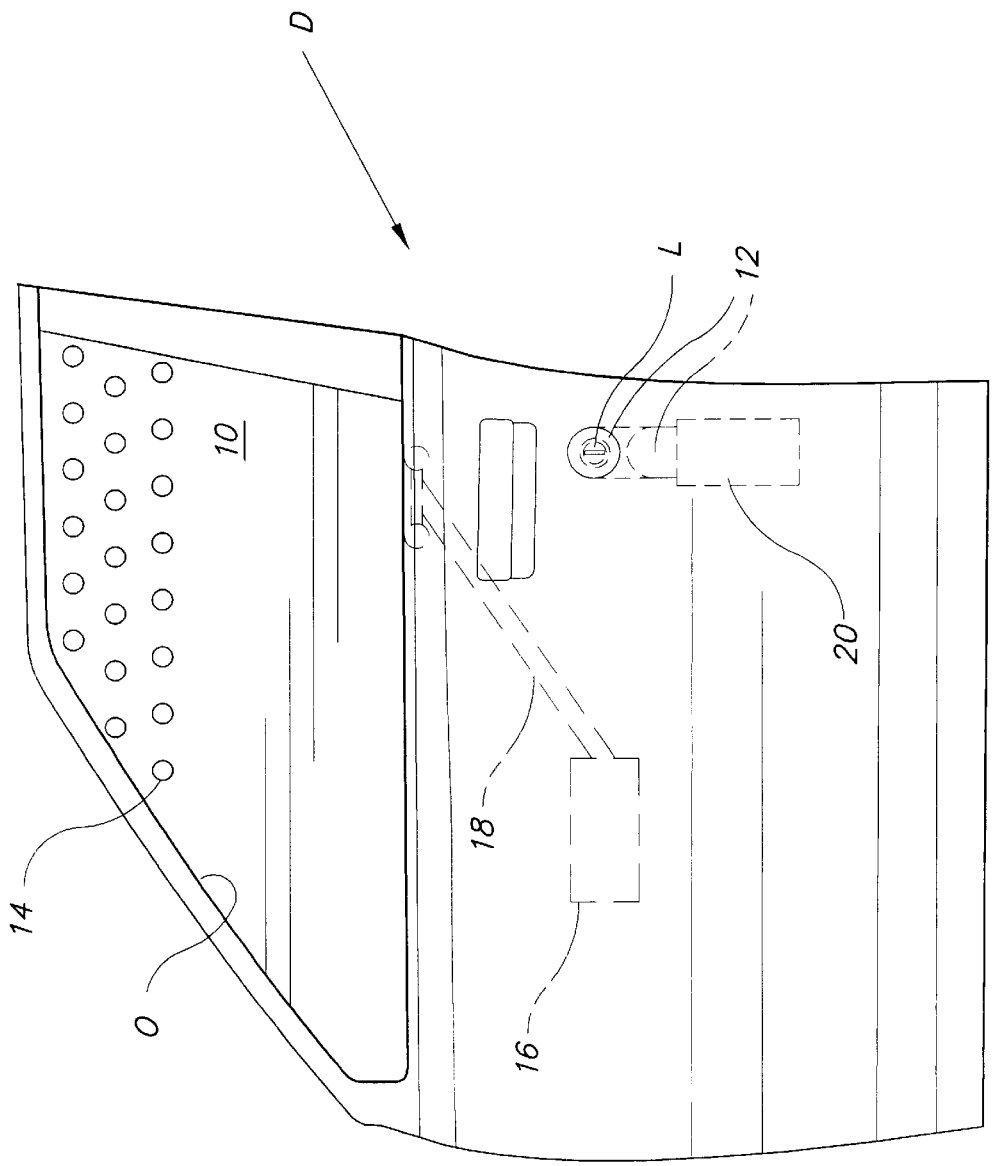
FIG. 2 is a side elevation view of a motor vehicle door in which the vehicle theft prevention system has been installed, according to the present invention.

Such a vehicle V also conventionally includes a front windshield F, a rear backlight B, a roof structure R, and a series of exterior locks L (one of which is shown in FIG. 2 of the drawings). The present invention comprises at least one (and preferably a series of) opaque protective plates 10 which are selectively extendible over the window opening areas O and exterior locks L of the vehicle V, thereby effectively precluding unauthorized entrance to the vehicle V when the present system is deployed. The various window area protective plates 10 and lock protective plates 12 may be installed independently of one another within a vehicle V, if so desired, but are preferably installed in combination with one another to provide maximum protection for the stationary vehicle V and its contents or occupants.

FIG. 2 provides a side elevation view of a door panel D incorporating the present invention therewith. In FIG. 2, the window area protective panel or plate 10 has been raised to its extended or closed position, with the lock cover plate 12 being shown in its lowered position in dashed lines for accessing the lock L, and in its raised position in solid lines for blocking access to the lock L. The protective plates 10 and 12 of the present invention are preferably formed of a strong, solid, opaque material, such as steel plate having a thickness on the order of the thickness of conventional vehicle window glass, although other tamper and impact resistant materials of different thicknesses and weights may be used as desired.

The window opening protective plates 10 may include a series of ventilation holes 14 therethrough. The ventilation holes 14 are preferably arranged in rows arrayed across the upper section of the protective sheet 10, operating as a conduit for fresh air for any persons inside. In alternative embodiments, holes, orifices, slots, and openings of any shape, arrangement, and size are embraced.

The lock protective mechanism essentially comprises a plate 12 which is extendible over the exterior of the lock cylinder L and keyhole. Such lock protective mechanisms may be installed within the doors D of the vehicle V adjacent to the locks, with the actuating mechanism being installed within the hollow interior of the door D between the exterior sheet metal E and the interior trim panel U, with the protective plate 12 selectively extending to the exterior of the vehicle door D to cover the lock cylinder L as desired.

FIG. 2 also provides an indication of the actuating mechanism for the present window opening protective plates 10 and lock protective plates 12. All modern automobiles include a window lift assembly located in the doors of the vehicle. The most common type of window lift assembly incorporates a "scissor mechanism." A scissor-type system includes a door, a window vertically moveable within the door, a horizontal support bracket on the window, and a scissor mechanism supported on the door and engaged with a track on 1the support bracket. A sector rack is supported on the scissor mechanism, and a pinion gear supported on the door is engaged with the sector rack.

Typically, in vehicles with power windows, a worm gear driven by a motor, such as the motor indicated at 16 in FIG. 2, is engaged with the driven gear, which in turn, is operatively joined to the pinion gear. The motor 16, worm gear, and the driven gear are all mounted within the door D or other body panel P of the vehicle V. In vehicles without power windows, the pinion gear is driven by a manual hand crank. It should be understood that this specification embraces any window lift or mechanical drive assemblies, generally referenced herein by the numeral 18, conventionally used for power or hand crank windows.

The exterior lock protective plate 12 is preferably actuated by means of an electric motor or solenoid drive mechanism 20, such as that conventionally used for the actuation of automatic door locks in motor vehicles. Each steel panel section 10 or lock cover 12 may move individually under direct operator control, allowing, for example, the operator to enter the vehicle V, even though the window protective panels 10 may still be in raised position.

Figure 3:
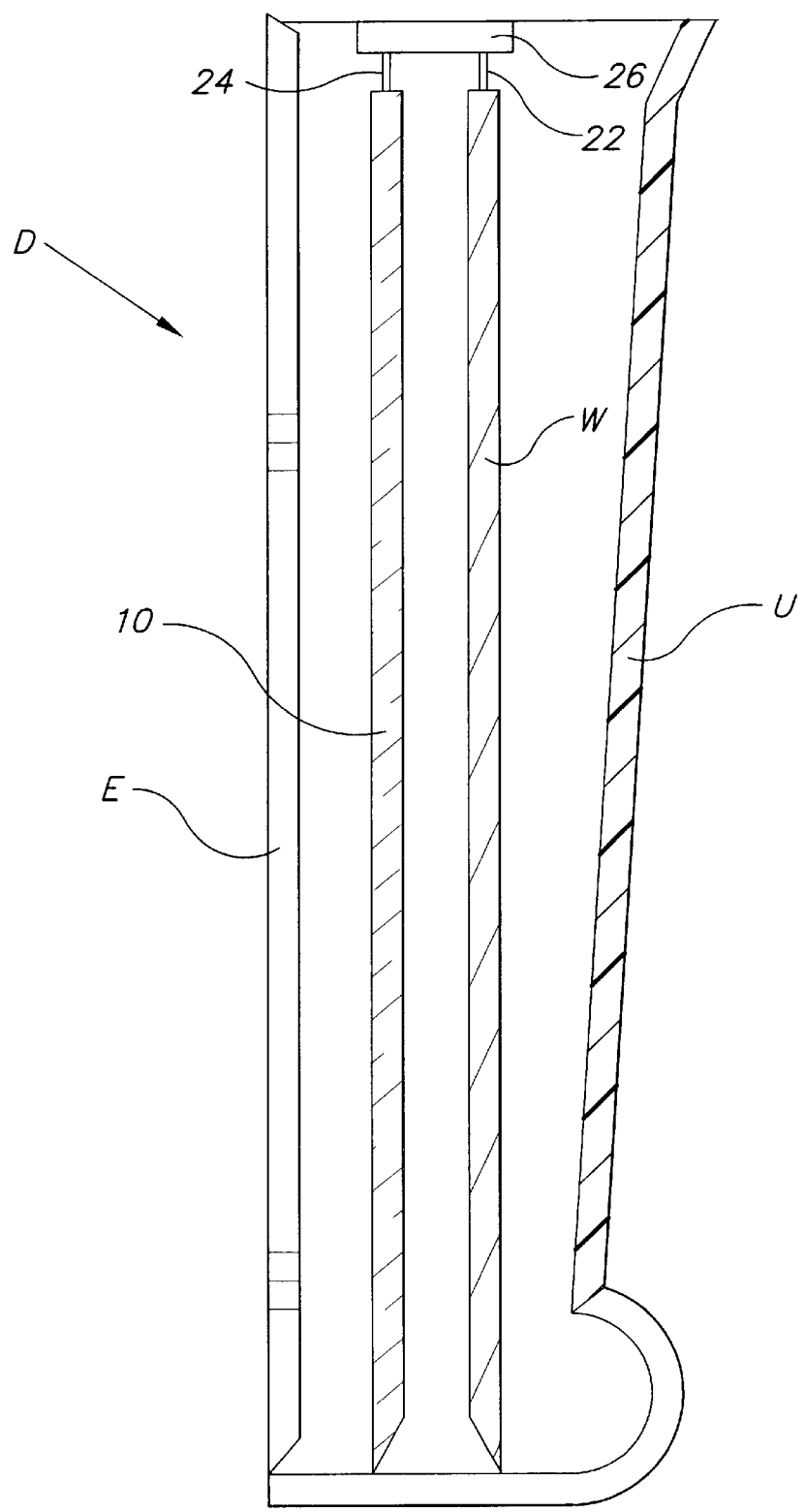
FIG. 3 is a top plan view in section of a vehicle door in which the vehicle theft prevention system has been installed, according to the present invention.

FIG. 3 provides a top plan view in section of a vehicle door D incorporating the window opening protective panels 10 of the present invention; the lock protective mechanism is not shown, for clarity in the drawing Figure. It will be seen that while the section view of FIG. 3 is described as an openable vehicle door panel, that it may also be used to illustrate the installation of the present protective panels 10 within a fixed, stationary panel of the vehicle, such as the side panel immediately behind the front door in a two door vehicle.

The door D has an exterior body panel E and an opposite interior trim or upholstery panel U defining a hollow area therebetween, as is conventional in vehicle door or body panel construction. Both the vehicle side window glass W and the protective window opening cover plate 10 are housed within the vehicle door D or panel structure P when the glass W and panel 10 are retracted, with the protective plate 10 being disposed exteriorly to the window pane W, as shown in FIG. 3.

Preferably, the window W and protective plate 10 are actuated independently of one another by two separate operating mechanisms, such as the conventional mechanism 16 and 18 illustrated in FIG. 2 of the drawings. In alternative embodiments of the invention the window track 22, protective panel track 24, and support bracket 26 for the assembly may further comprise any window lift or mechanical drive assemblies, racks, gears, pinions, or levers for raising and lowering the panel sections 12 and vehicle window panes 22.

The window W and plate 10 each has its own track, 22 and 24, respectively. This enables the windows W to remain lowered when the protective panels 10 are raised to protect the interior of a stationary vehicle V, with the ventilation holes 14 of the protective panels 10 providing airflow to the interior I of the vehicle V. This also allows. the windows W to be closed and the protective panels 10 to be lowered, for operating the vehicle V in inclement weather. However, the same motor 18 may be used to operate both the protective panel 10 and its adjacent glass window pane W simultaneously, if so desired.

Figure 4:
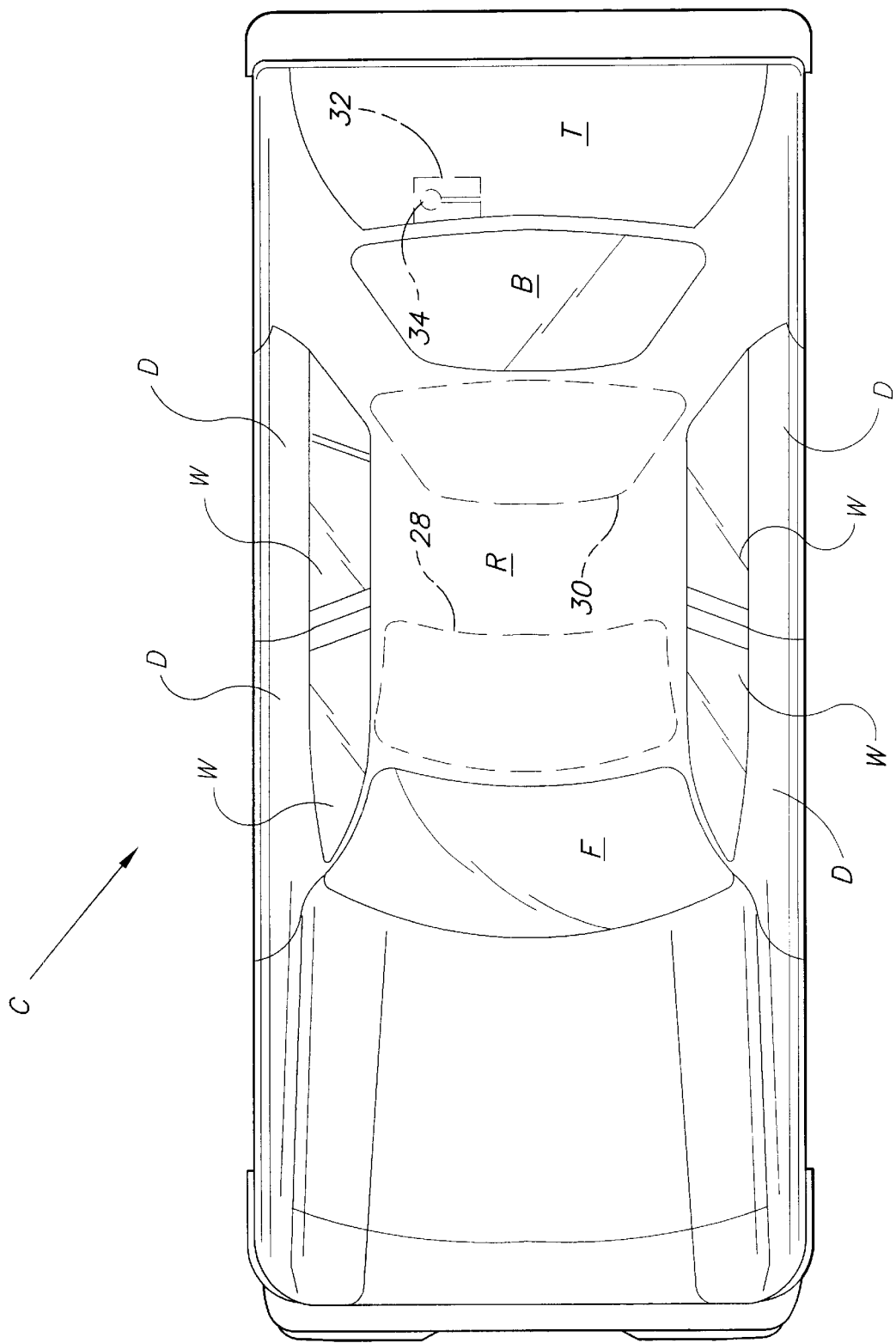
FIG. 4 is a top plan view of a motor vehicle in which the vehicle theft prevention system has been installed, illustrating the front and rear protective panel installation according to the present invention.

FIG. 4 provides a basic top plan view of a vehicle V incorporating front windshield and rear backlight opaque protective panels, respectively 28 and 30. These two panels 28 and 30 may be formed of the same materials as those used for the side window opening protective panels 10, discussed further above. The two panels 28 and 30 may be retracted immediately beneath the roof R of the vehicle V, between the roof R and the conventional interior headliner upholstery of the vehicle V. Actuation of these two panels 28 and 30 may be by means of a conventional mechanism 29 such as that used for the operation of a vehicle sunroof, or by means of a conventional window actuating mechanism such as that indicated generally as mechanism 16 and 18 in FIG. 2 of the drawings. Either manually actuated, hand cranked mechanisms or electrically or hydraulically powered mechanisms may also be incorporated for the actuation of the two panels 28 and 30, as desired.

The two panels 28 and 30 extend from slots along the upper edges of the windshield F and rear glass B, between the windshield F and rear glass B and the adjacent forward and rearward edges of the roof R of the vehicle V. The panels 28 and 30 may include conventional sealing means along their respective forward and rearward edges to seal the otherwise open gap at the top of the windshield F and rear backlight glass R, as desired; a similar means may be used to seal the gap for the side window protective panels 10 discussed further above.

Extension of the side window protective panels 10, the lock cover bars 12, and the forward and rearward protective panels 28 and 30, results in a vehicle V having secure protection against break-in or theft. The present system may be used to provide positive protection for an unattended vehicle, as well as serving to provide protection for the occupants and/or contents of a stationary vehicle, as desired. The present system may incorporate conventional remote actuation technology (infrared or other electromagnetic spectrum signals, etc.) 31 in the manner used conventionally for remotely actuated vehicle door locks and remotely actuated alarm systems. The present system may be used in consort with other conventional vehicle security systems including an alarm system, door locks, trunk latch, etc.

As the present system is dependent upon electronics and electromagnetic signals for its actuation and operation, some alternative means of operating the system is desirable in the event of electrical failure. Accordingly, the system may also include an emergency release switch 32 preferably located in the trunk T for selectively releasing the covers 12 over the locks L when necessary. A separate key 34 may be used to actuate the emergency switch 32 or open the enclosure containing the switch. This allows a user to gain access to the interior of the vehicle V and is an important failsafe for insuring the security of the vehicle V. In the event that a lock protective mechanism 12 and 20 is provided for the trunk lock as well, the emergency actuation means may be concealed elsewhere on the vehicle V, in a locked enclosure, etc.

The present system, with its electronic operation, is well suited to operation by means of various computerized systems which provide for the selective actuation of various components of the system, as desired. The present system may incorporate a multiplexed system for operating the protective panel sections 10, 28, and 30 and lock covers 12, as well as any accessory security components (alarms, etc.). A central control switch allows the entire system to be controlled as one unit and may include a microcomputer for selectively or individually controlling the height of the side window opening protective panels 10 to a predetermined position.

In conclusion, thousands of cars are broken into and stolen yearly due to inadequate security. As society becomes increasingly dangerous, sociologists have observed that criminals are becoming more willing to commit destructive damage or inflict harm in order to accomplish their purposes. Also, one of the greatest fears of a parent is that a criminal will commandeer their car when their child is still inside. Despite these unfortunate societal trends, it is interesting to note that federal regulations require the use of relatively easily breakable laminated safety glass windows which provide almost no protection from an aggressive attacker. The present invention presents an important solution to this problem by providing a vehicle security system which insures that a user may selectively and remotely "lock down" or close off their vehicle so as to prevent access by intruders or other outside parties and thereby insure the safety of any people and/or property inside.

It is to be understood that the present invention is not limited to the embodiments described above, but encompasses any and all embodiments within the scope of the following claims.

I claim:

1. In a motor vehicle having an interior, at least one hollow side panel with a window opening therein, at least one side window, a front windshield having an exterior surface, a rear backlight having an exterior surface, a roof, and at least one exterior lock, a vehicle theft prevention system, comprising:

at least one selectively extendible, opaque protective panel for precluding access to the interior of the vehicle, said at least one selectively extendible protective panel being disposed within the at least one hollow side panel and exteriorly of the at least one side window of the vehicle;

at least one selectively extendible exterior lock protective plate for precluding access to the at least one exterior lock of the vehicle by unauthorized persons;

a front windshield opaque protective panel and a rear backlight opaque protective panel, each selectively extendible from within the roof of the vehicle to cover the exterior surfaces of said front windshield and said rear backlight;

means for selectively and reversibly extending said at least one protective panel from the at least one side panel, for selectively covering the window opening of the at least one side panel of the vehicle; and means for selectively extending said front windshield protective panel and said rear backlight protective panel from the roof of the vehicle, for selectively covering the respective exterior surfaces of said front windshield and said rear backlight of the vehicle.

2. The vehicle theft prevention system according to claim 1, wherein said at least one protective panel is formed of steel plate.

3. The vehicle theft prevention system according to claim 1, wherein said at least one protective panel includes a plurality of ventilation holes therethrough.

4. The vehicle theft prevention system according to claim 1, wherein said exterior lock protective plate comprises a motor actuated plate selectively extendible exteriorly of the exterior lock of the vehicle for covering the exterior lock and precluding unauthorized access thereto.

5. In a motor vehicle having an interior, at least one hollow side panel with a window opening therein, at least one side window, a front windshield, a rear backlight, a roof, and at least one exterior lock, a vehicle theft prevention system, comprising:

at least one selectively extendible, opaque protective panel for precluding access to the interior of the vehicle, said at least one selectively extendible protective panel being disposed within the at least one hollow side panel and exteriorly of the at least one side window of the vehicle;

at least one selectively extendible exterior lock protective plate for precluding access to the at least one exterior lock off the vehicle by unauthorized persons;

a front windshield opaque protective panel and a rear backlight opaque protective panel, each selectively extendible from within the roof of the vehicle to cover the exterior surfaces of said front windshield and said rear backlight;

a first electric motor for selectively and reversibly extending said at least one protective panel from the at least one side panel, for selectively covering the window opening of the at least one side panel of the vehicle;

a second electric motor for selectively extending said front windshield protective panel and said rear backlight protective panel from the roof of the vehicle, for selectively covering said front windshield and said rear backlight of the vehicle;

a third electric motor for selectively extending said lock protective plate; and remote actuation means for controlling said at first electric motor, said second electric motor and said third electric motor.

6. The vehicle theft prevention system according to claim 5, wherein said at least one protective panel is formed of steel plate.

7. The vehicle theft prevention system according to claim 5, wherein said at least one protective panel includes a plurality of ventilation holes therethrough.

* * * * *